Sept. 4, 1962    G. J. KIRCHNER ETAL    3,052,338
COOLING-BED RUN-IN CONVEYOR AND KICKOUT
Filed Oct. 15, 1959    6 Sheets-Sheet 1
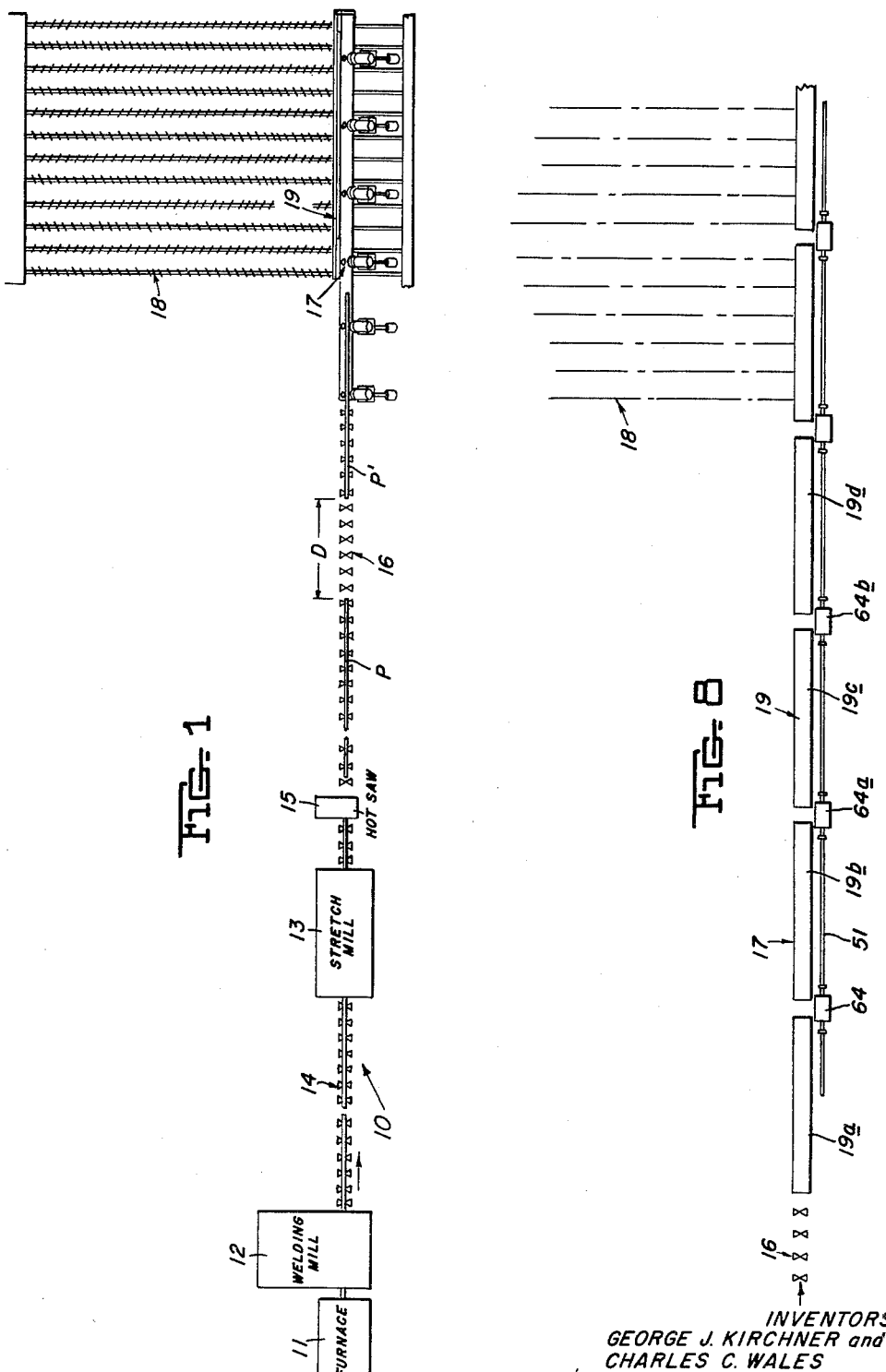
INVENTORS
GEORGE J. KIRCHNER and
CHARLES C. WALES
By Donald G. Dalton Attorney

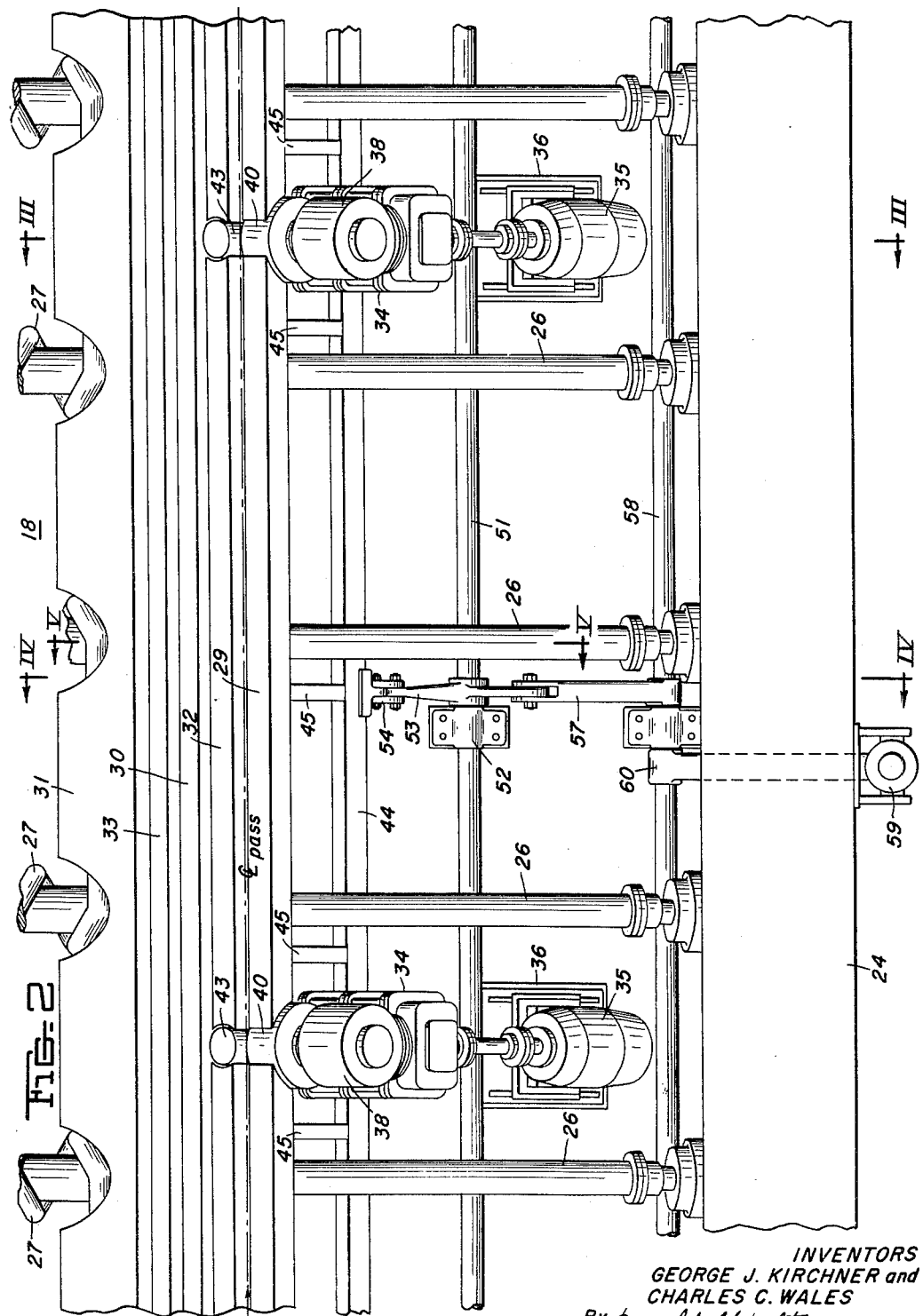

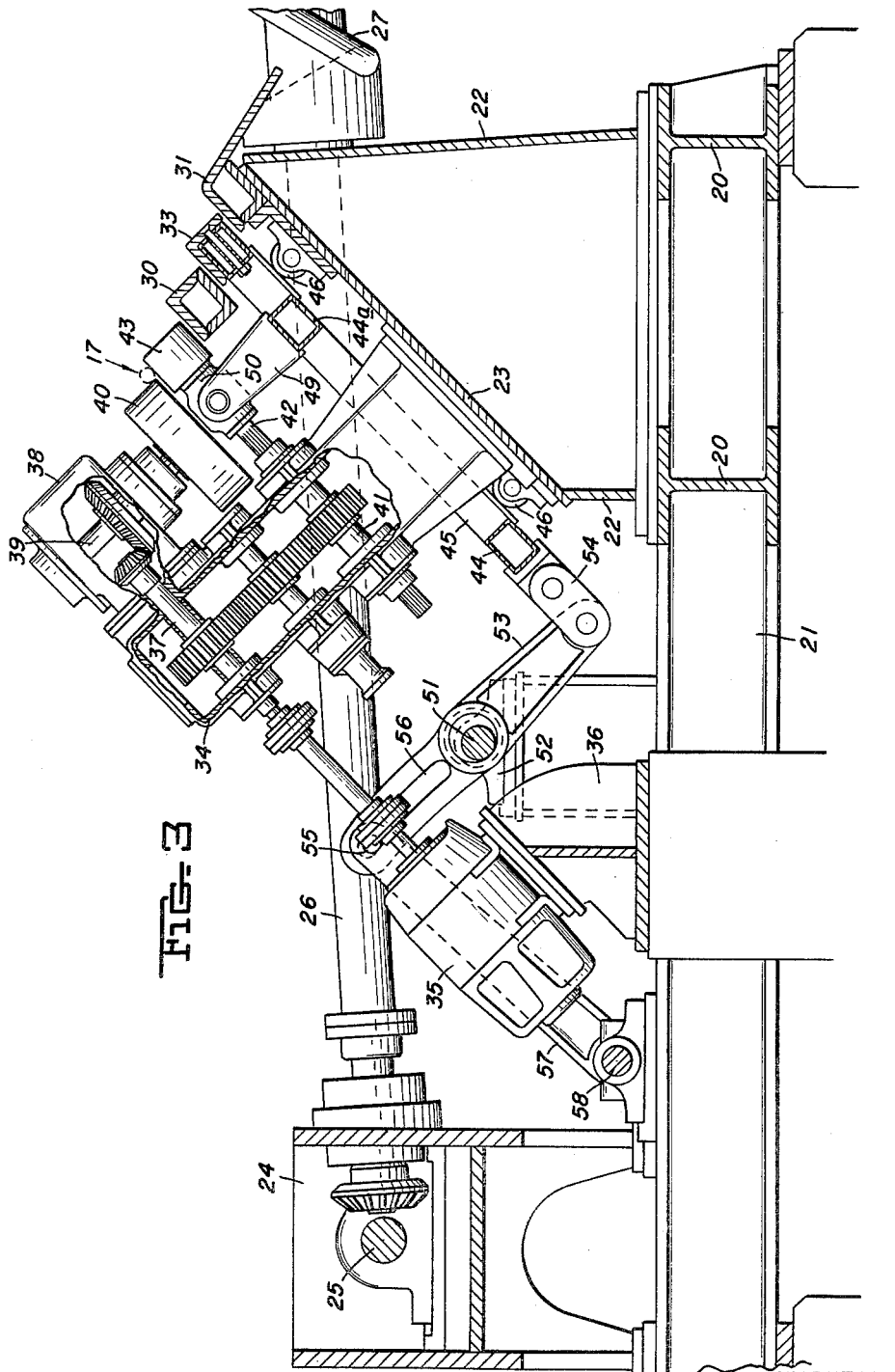

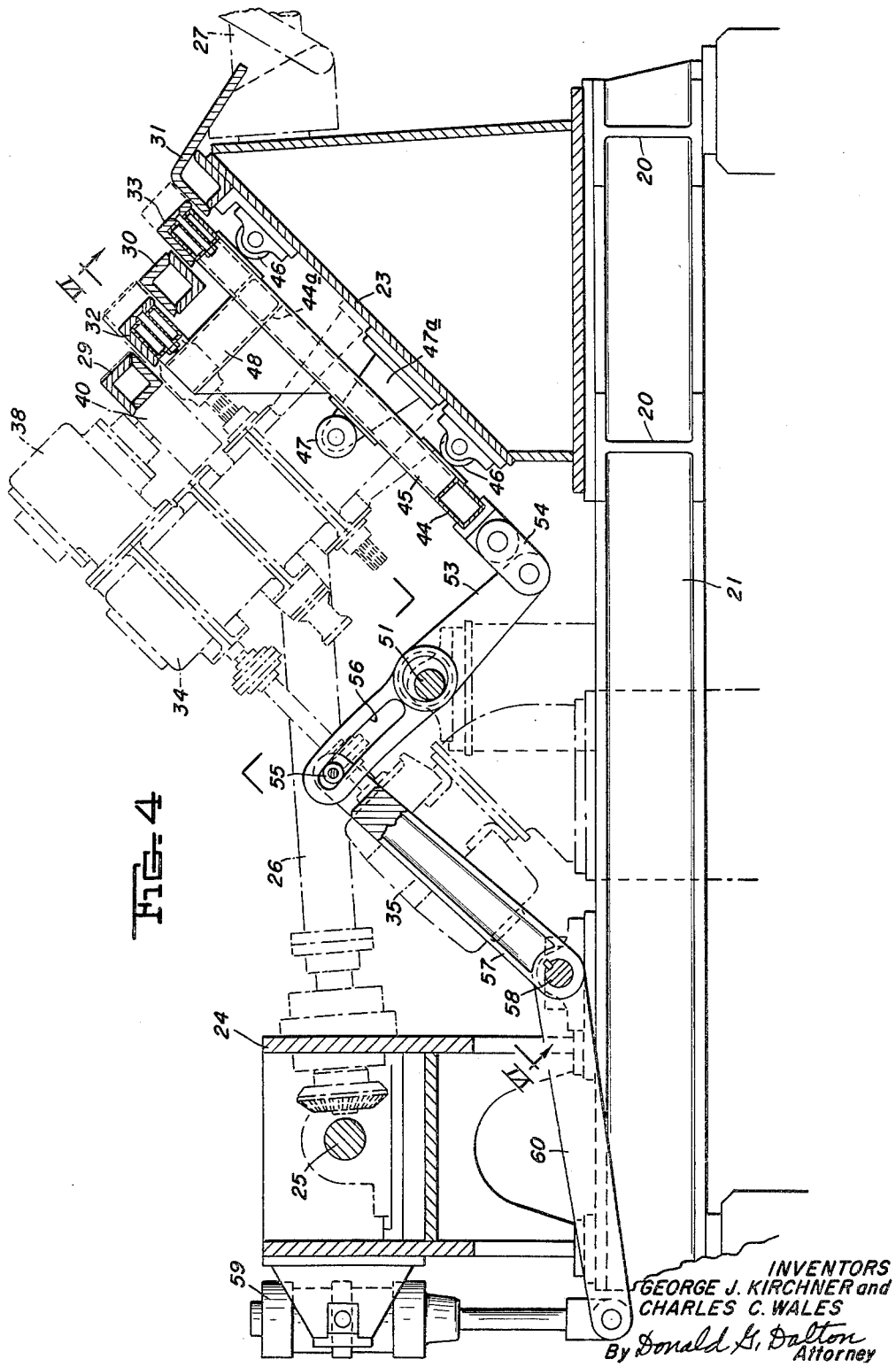

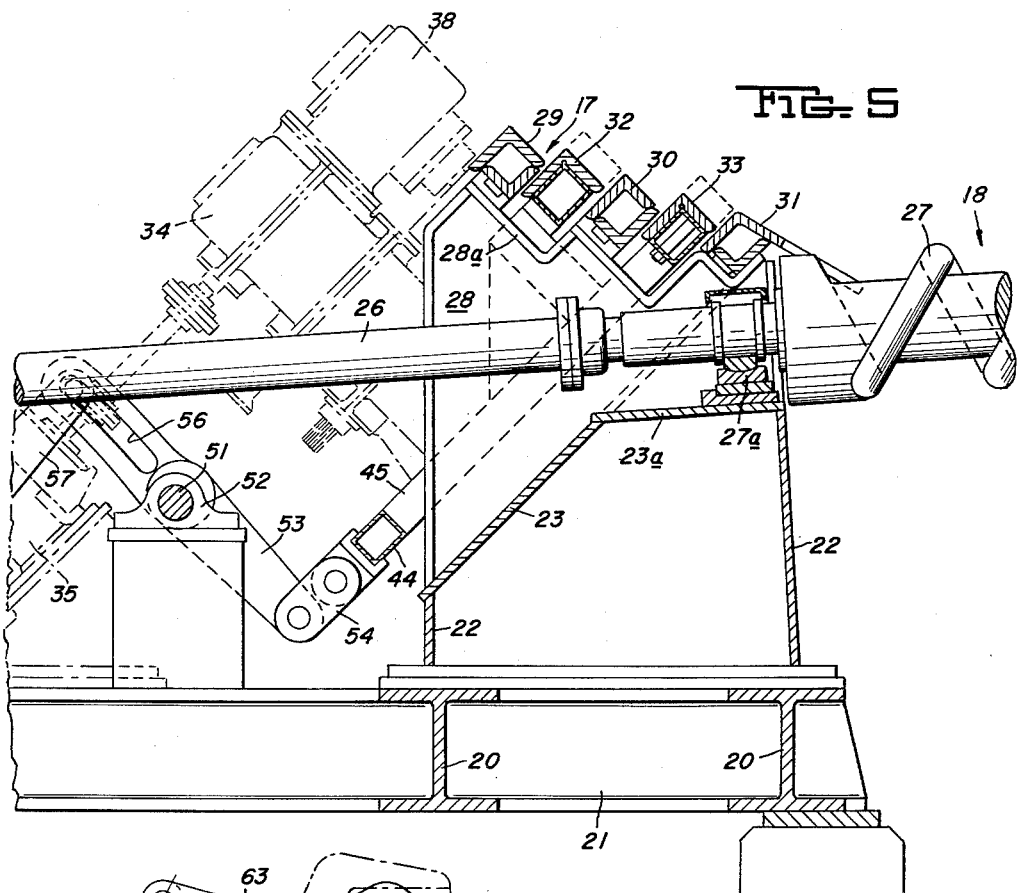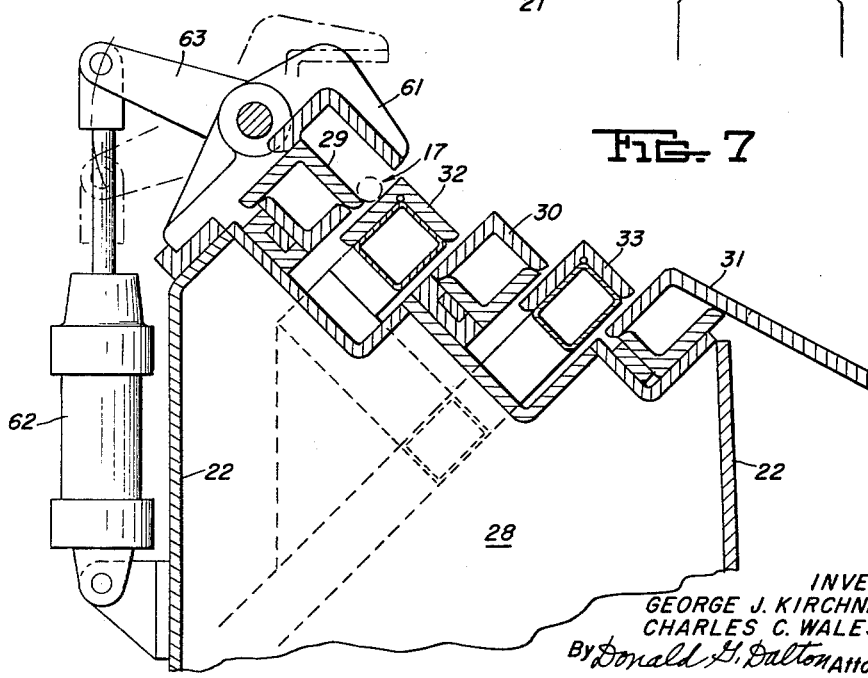

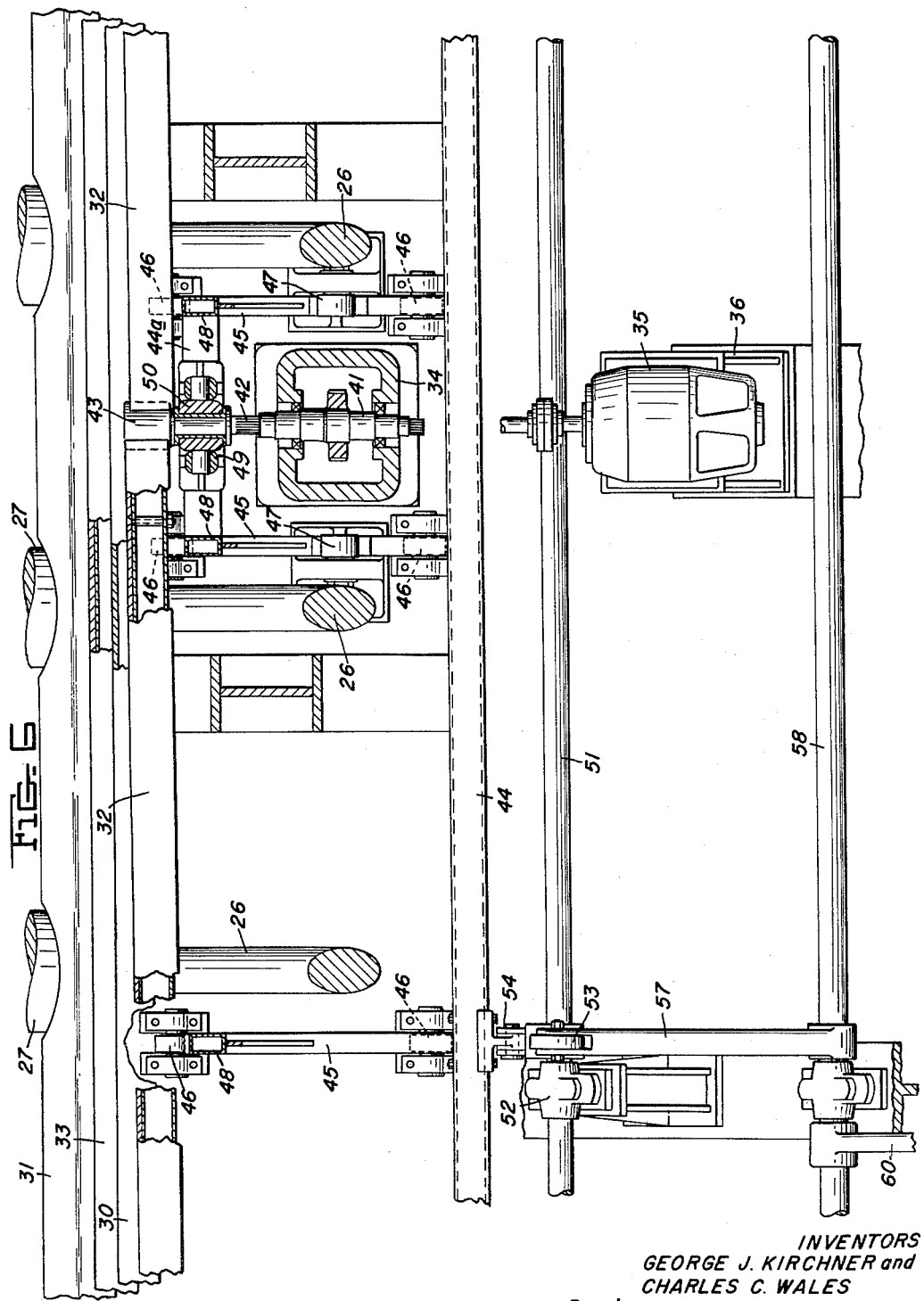

United States Patent Office 3,052,338
Patented Sept. 4, 1962

3,052,338
COOLING-BED RUN-IN CONVEYOR
AND KICKOUT
George J. Kirchner, Whitehall Borough, Pa., and Charles C. Wales, Bay Village, Ohio, assignors to United States Steel Corporation, a corporation of New Jersey
Filed Oct. 15, 1959, Ser. No. 846,743
6 Claims. (Cl. 198—24)

This invention relates to a conveyor adapted to receive lengths of hot-rolled product traveling longitudinally and to a kickout effective to transfer the lengths laterally from the conveyor to a cooling bed alongside the latter.

Modern mills for making pipe by the continuous buttweld process are capable of making a wide range of sizes and of delivering minimum-sized product at very high speeds, i.e., around 2000 f.p.m. or more. A serious problem arises as a result, in respect to the disposition or sidewise transfer of cooling-bed lengths, up to 85′, from the line of delivery onto a cooling bed located laterally thereof. In fact, the time required for this kickout motion is the bottleneck which constitutes a limitation on the operating speed of the entire mill. It is necessary, in the first place, after a length has been cut on the fly, to accelerate it to an even higher speed in order to create the interval between it and the next succeeding length, which is required for the operation of any type of kickout apparatus to make the transfer and return to receiving position before the leading end of the next length arrives. It is then necessary, after kickout has been effected, to provide for bringing the length to rest by sliding friction on a conveyor apron, so it can then be moved sidewise onto the cooling bed. The problem is further complicated by the extreme flexibility of the product in the smaller sizes and the danger that a hooked leading end may foul on a stationary part of the apparatus and result in a cobble.

We have invented a novel run-in conveyor and kickout apparatus capable of pushing off a cooling-bed length therefrom in a fraction of a second and returning to a condition providing support for the next length as soon as the previous length has been removed from the line of delivery. Our run-in conveyor, which receives lengths from the conventional run-out conveyor beyond the rotary flying hot saw of a pipe mill, is composed of numerous pairs of cylindrical rollers, the rollers of each pair being disposed substantially at right angles, with their peripheries extending inwardly of the sides of a trough of V-shape. One side of the trough is fixed and one movable to and fro. We mount one roller of each pair for axial movement with the movable trough side to a withdrawn position and provide the movable trough side with a pusher face whereby a length may be dropped from the trough onto a stationary apron therebelow for transfer to a cooling bed as the axially movable rollers return to normal position for receiving the next oncoming length.

A complete understanding of the invention may be obtained from the following detailed description and explanation which refer to the accompanying drawings illustrating the present preferred embodiment. In the drawings:

FIGURE 1 is a small-scale diagram showing the relation of our run-in conveyor to the cooling bed and the conventional run-out conveyor of a pipe mill;

FIGURE 2 is a partial plan view of our run-in conveyor and kickout with parts omitted for clearness;

FIGURES 3, 4 and 5 are transverse sectional views taken, respectively, on the planes of lines III—III, IV—IV and V—V of FIGURE 2;

FIGURE 6 is a section through the conveyor and kickout taken on the inclined planes of line VI—VI of FIGURE 4;

FIGURE 7 is a section similar to FIGURE 5 showing a modification; and

FIGURE 8 is a diagrammatic plan view of the cooling bed and its run-in conveyor.

Referring now in detail to the drawings and, for the present, particularly to FIGURE 1, a continuous buttweld pipe mill 10 comprises a skelp-heating furnace 11, a forming and welding section 12 and a stretch-reduction section 13 connected thereto by a conveyor 14 composed of V-groove rollers. A rotary flying hot saw 15 cuts the delivered product into cooling-bed lengths as it travels along a run-out conveyor 16 similar to conveyor 14. The apparatus enumerated thus far is conventional.

A run-in conveyor 17 for a cooling bed 18 is continuous with conveyor 16 and the kickout of our invention indicated generally at 19, is incorporated therein. The V-groove rollers of conveyor 16 are driven at a peripheral speed in excess of the speed at which pipe is delivered from the stretch-reduction section 13. Thus, as soon as a cooling-bed length indicated at P is severed from the oncoming continuous product, it is accelerated and, by the time it reaches the kickout position P′ on conveyor 17, it has gained a clear distance D ahead of the leading end of the next succeeding length, then in position P.

Referring now to FIGURES 2–6, the run-in conveyor 17 and kickout 19 are carried on a structural grid composed of longitudinal beams 20 and transverse beams 21 (FIGURES 3–5). These beams are omitted from FIGURES 2 and 6 to avoid unnecessarily complicating the showings thereof. The immediate support for the conveyor and the kickout is a frame extending the length of the conveyor, having side walls 22, standing on beams 20, and a sloping deck 23 carried by the side walls. A shaft housing 24 along the side of the conveyor remote from cooling bed 18 and spaced therefrom has a line shaft 25 journaled therein. Spindles 26 extending across the conveyor at intervals therealong are driven by shaft 25 through bevel gearing and are coupled to screws 27 constituting bed 18. Deck 23 is cut out in the regions of screws 27 and a plate 23a fitted therein to support a bearing 27a for one end of each screw (FIGURE 5).

Adjacent certain of the spindles 26, supporting web plates 28 extend upwardly from frame 22, 23. These plates have notches 28a on their upper edge to which are secured in spaced step-like relation, fixed trough sides or aprons 29, 30 and 31. The aprons are box-section girders formed of two angle bars extending the length of the kickout. Retractable trough sides or kickout bars 32 and 33 are located between aprons 29 and 30 and between aprons 30 and 31, respectively. Each bar has a supporting face (left side) and a pusher face (right side). They are simply angle-section bars having water boxes secured to their undersides. Apron 29 and bar 32 form a conveyor trough one side of which is fixed and the other movable. The manner in which bars 32 and 33 are supported and operated will be explained shortly. Bars 29, 30, 32 and 33 together provide a succession of V-shaped troughs descending from one side of the conveyor to the other.

Between certain pairs of spindles 26, gear boxes 34 (FIGURE 3) are mounted on deck 23. A motor 35 mounted on a pedestal 36 is coupled to an upper shaft 37 journaled in each box. An auxiliary housing 38 secured to box 34 has a shaft 39 journaled therein at right angles to shaft 37 carrying an outboard conveyor roller 40. A shaft 41 journaled in box 34 parallel to shaft 37 is driven by the latter through connecting gearing. An extension shaft 42 splined to shaft 41 carries a conveyor roller 43 thereon. The peripheries of rollers 40 and 43 project inwardly of the faces of apron 29 and bar 32 which are interrupted to accommodate them (FIGURE 2). Thus rollers 40 and 43, when in the relative positions shown, together with the apron 29 and bar 32, form a V-trough, the roller peripheries extending slightly above the surfaces of the trough sides.

A length of pipe traversing the run-in conveyor 17 is confined in the trough formed by the apron 29, bar 32 and rollers 40 and 43. The spacing between centers of adjacent motors 35 is about ten feet and that between screws 26 is about three feet so it will be evident that the conveyor 17 includes a great number of pairs of rollers 40 and 43 and that a cooling bed 18 wide enough to handle pipe lengths eighty-five feet long includes a great number of screws 27. That is to say, FIGURE 2 shows only a small portion of the length of conveyor 17 or the width of bed 18. Rollers 40 and 43 are driven so their peripheral speeds are the same as that of the rollers forming conveyor 16.

A longitudinal box-section beam 44 extending along frame 22, 23 on the side remote from screws 27 has studs 45 spaced therealong at right angles thereto (FIGURES 2 and 4), extending toward the screws. The studs adjacent the gear boxes 34 ride on rollers 46 mounted on deck 23. Overhanging hold-down rollers 47 journaled in standards 47a on deck 23 engage the upper sides of studs 45. Bar 33 is secured directly to the ends of the studs and the studs have upstanding posts 48 thereon to which bar 32 is secured. A box-section girder 44a (FIGURE 3) extends between the studs 45 on opposite sides of each gear box 34. Beam 44, studs 45 and girder 44a constitute an elongated flat structural slide frame reciprocable across deck 23.

A fork 49 on each girder 44a has a radial and thrust bearing 50 therein. Shaft extension 42 of the adjacent gear box 34 extends through this thrust bearing. It is thus apparent that lateral movement of the frame composed of beam 44, studs 45 and girders 44a, on rollers 46, by means now to be described, causes sidewise reciprocation of kickout bars 32 and 33 and axial reciprocation of rollers 43. Thus, on downward movement of bar 32 and rollers 43, from the positions shown in FIGURES 3 and 4, a pipe length traveling down the V-trough formed by apron 29 and bar 32 will fall into the next lower trough formed by bar 32 and apron 30. It will continue to skid therealong but will be decelerated gradually by friction. As shown in FIGURE 6, the ends of the sections of bar 32 adjacent each roller 43, are displaced outwardly and inwardly at the end of the roller, respectively, in the direction of travel of an advancing length. This prevents any possibility of the fouling of the leading end of the length while sliding on apron 30.

On a succeeding forward or upward movement of kickout bar 32, the length will be pushed off of apron 30 and fall onto bar 33, while it continues skidding thereon. On the next retraction, it will fall onto apron 31 where it will come to rest alongside bed 18 and, on the next forward movement, will be pushed therefrom by bar 33 and fall onto the cooling-bed screws 27. By this means, several lengths are in the process of being frictionally decelerated simultaneously. This makes it possible to dispose of one length before the next arrives, even though the time required for deceleration is greater than the time interval between the trailing end of one length and the leading end of the next. Because of the foregoing, bed 18 is positioned some distance downstream from the entrance to conveyor 17 and kickout is effected before the lengths come alongside of bed 18. It now remains to describe the means for reciprocating frame 44, 45, 44a.

An eccentric shaft 51 parallel to shaft 25 is journaled in bearings 52 upstanding on beams 21 (FIGURES 3–5). Eccentrics on the shaft oscillate levers 53 spaced along the run-in conveyor. Links 54 are pivoted to the lower ends of levers 53 and to beam 44. Any suitable means (not shown), under appropriate control, is provided for rotating shaft 51 within a predetermined short time, say 0.5 second. Each lever 53 has a movable fulcrum in the form of a roller 55 adapted to traverse a slot 56 in the upper end thereof. Each roller 55 is journaled on a crank arm 57 keyed to a rock shaft 58. Shaft 58 is rocked by a fluid-pressure motor 59 trunnioned to tunnel 24. The piston of motor 59 is pivoted to a crank arm 60 keyed to shaft 58 (FIGURES 2–4).

It will be evident from FIGURE 4 that rotation of shaft 51, while roller 55 is in the illustrated position, will cause levers 53 to retract frame 44, 45 and 44a and bars 32 and 33 from their intermediate or solid-line positions to their lower dotted-line positions (FIGURE 5) and then restore them. The rate of travel of the several members depends on the speed at which shaft 51 is driven. When the reciprocating frame and aprons have been restored to starting position after a downward retraction, motor 59 is operated to rock shaft 58 clockwise. This throws rollers 55 to the lower ends of slots 56 and causes the frame and bars to move to the upper dotted-line positions. Reverse operation of motor 59 brings the bars and rollers back to starting or intermediate position. By this dual drive for levers 53, the initial downward retraction and restoration of the aprons may be effected quickly and the subsequent upward advance at a lower speed. It will be understood that operation of the eccentric-shaft drive and the motor 59 must be properly coordinated and that start of the former may be initiated by the arrival of the leading end of a length at a given point on conveyor 17, by means of a photocell, flag switch or the like.

The timing of the operations of the eccentric shaft 51 and the motor 59 is important. For handling minimum-sized pipe, shaft 51 is driven through a complete revolution to effect quick retraction of rollers 43 and bars 32 and 33 from their intermediate positions and a prompt return thereto. A slight time interval is permitted to elapse before motor 59 is operated. This pause or time interval affords an opportunity for the length being kicked out to slide on apron 30 and partially decelerate. Thereafter, on operation of motor 59, the length is kicked off of apron 30 and falls onto bar 33 for further deceleration. On the next retraction, it falls onto apron 31 where it finally comes to rest. Motor 59 is preferably operated slowly to kick out and quickly to retract.

The dual drive described above is used for handling the smaller sizes of pipe, the delivery speeds of which are the greatest. When larger pipe is being made, it is not necessary to provide for so much skidding travel on the aprons because the delivery speed is lower. In that event, motor 59 is operated to move rollers 55 to the lower ends of their slots and they are left there. This makes the forward or upper most position of bars 32 and 33 the starting position and rotation of the eccentric shaft 51 causes the bars to be pulled back and thrust forward through their entire stroke for every complete shaft rotation.

When kicking out larger sizes, rollers 43 and bars 32 and 33 are retracted from their uppermost position and immediately returned thereto. Thus the length has almost no time for sliding longitudinally on apron 30 but is immediately kicked out and falls onto bar 33. It slides to a stop thereon and is then kicked out onto the cooling bed on the next retraction and return, with no longitudinal movement on apron 31.

FIGURE 7 shows a modification in which an elongated cover 61 extending the length of conveyor 17 is pivoted to web plates 28. Motors 62 pivoted to the plates operate the cover through cranks 63 from open to closed or partly closed position. In such positions, the cover confines the pipe lengths as they travel down the trough 29, 32, and prevents any tendency thereof to jump out. Cover 61 may be designed to extend over apron 30 as well as bar 29 if desired.

By virtue of the construction of aprons 29, 30 and 31 and kickout or pusher bars 32 and 33, cooling fluid may be easily circulated therethrough, if desired, by making suitable pipe and hose connections thereto.

FIGURE 8 shows a further feature of the invention.

According to this feature, the kickout 19 is composed of a number of sections 19a, 19b, 19c, etc., arranged in line. One or more of these sections at the entering side are arranged to be deactivated so far as concerns the kickout function while still continuing to serve as parts of the run-in conveyor 17. To this end, shaft 51 is sectionalized, the portions of the shaft corresponding to sections 19a, 19b, 19c, etc., being connectible by pneumatic clutches 64, 64a, 64b, etc., to the remainder thereof which is driven. When delivering pipe larger than the minimum size, at a speed correspondingly lower than the maximum delivery speed, less sliding distance on the apron plates is required to bring a length to rest after kickout. Therefore, by de-energizing one or more of the clutches 64, 64a, 64b, etc., kickout occurs only after a length has passed over section 19a or section 19b, 19c, etc., as the case may be. By thus reducing the sliding distance for delivery speeds lower than the maximum, all cut lengths are brought to rest in about the same position relative to the cooling bed, regardless of the actual speed of delivery.

The invention has numerous advantages many of which are self-evident. The primary one is the ability of the apparatus to kick out lengths traveling at maximum speed for gradual deceleration, and then return to position for receiving the next length by the time it approaches kickout position. As already explained, the structure of our invention affords a total period for deceleration greater than that available for kickout. The arrangement of rollers 40 and 43 with their axes about 45° to the horizontal affords the maximum driving relation with the pipe lengths and the fact that the sides of trough 29, 32 are at the same angles gives them the greatest confining effect so that slip-offs are unlikely, even without the cover 61.

The dual drive for the kickout bars, as has been emphasized, permits a shorter and quicker stroke and thus a longer sliding time on the aprons for small-sized pipe, than is needed for larger sizes. Apron 29 and bar 32 fit closely around rollers 40 and 43, respectively, and bar 32 moves with rollers 43 so that no gap is ever opened up in the conveyor trough which might result in the fouling of an advancing length.

On the initial retraction of bar 32 and rollers 43 to drop a length from the conveyor trough, the movement is downward so the weight of the moving parts assists the power drive in accelerating them from rest.

The smaller sizes of pipe, when hot, have the flexibility characteristic of a length of string. This makes evident the advantage of engaging the pipe by a continuous and unbroken pushing surface when kicking out sidewise rather than at numerous spaced points. Our invention makes it possible to kick pipe sidewise with greater force and consequently in shorter time without distorting the pipe or hooking the end as happens with conventional kickout apparatus now operating.

Although we have disclosed herein the preferred embodiment of our invention, we intend to cover as well any change or modification therein which may be made without departing from the spirit and scope of the invention.

We claim:

1. A run-in conveyor and kickout for a cooling bed comprising a plurality of angle bars disposed side-by-side with their vertices uppermost and the legs of their sections diverging downwardly, each bar except the last partially overlying one edge of an adjacent bar thereby providing a succession of V-shaped troughs descending from one side of the conveyor to the other, a sloping deck below said bars, upstanding web plates spaced along said deck supporting alternate bars, an elongated flat structural frame generally parallel to said deck extending thereover, the remaining bars being secured to said frame, anti-friction bearings on said deck supporting said frame for upward and downward movement, hold-down anti-friction bearings mounted on said deck, overhanging and confining said frame, and means reciprocating said frame across said deck.

2. The combination defined in claim 1, characterized by pairs of cooperating rollers spaced along said conveyor disposed with their axes at right angles and having their peripheries projecting inwardly from the sides of the uppermost trough, a gear box on said deck for each pair of rollers and driving shafts journaled in said box connected to the rollers of a pair, respectively.

3. The combination defined by claim 2, characterized by the axis of one roller of each pair being parallel to the direction of movement of said frame, a radial and thrust bearing mounted on said frame, a shaft mounting said one of said rollers journaled in said bearing and a telescoping driving connection between said last-mentioned shaft and one of said driving shafts.

4. The combination defined in claim 1, characterized by said reciprocating means inclding a lever pivoted to said frame and eccentric means cooperating with said lever.

5. The combination defined in claim 1, characterized by said reciprocating means including a lever pivoted to said frame and a rock shaft with a crank thereon, said lever having a slot therein and said crank having a roller thereon working in said slot.

6. The combination defined in claim 1, characterized by said conveyor being divided into sections longitudinally alined, and means for selectively uniting said reciprocating means of the several sections for simultaneous operation.

References Cited in the file of this patent

UNITED STATES PATENTS

| | | |
|---|---|---|
| Re. 18,996 | Peterson | Nov. 14, 1933 |
| 2,603,343 | Payne | July 15, 1952 |
| 2,744,412 | Sparklin | May 8, 1956 |

UNITED STATES PATENT OFFICE
CERTIFICATE OF CORRECTION

Patent No. 3,052,338                              September 4, 1962

George J. Kirchner et al.

It is hereby certified that error appears in the above numbered patent requiring correction and that the said Letters Patent should read as corrected below.

Column 6, under "UNITED STATES PATENTS" add the following:

2,868,348    Thurman et al. ---------- Jan. 13, 1959

FOREIGN PATENTS 516,452    France ------------------ Dec. 6, 1920
1,041,861   Germany ---------------- Oct. 23, 1958

Signed and sealed this 15th day of January 1963.

(SEAL)
Attest:

ERNEST W. SWIDER
Attesting Officer

DAVID L. LADD
Commissioner of Patents